(12) United States Patent
Flag et al.

(10) Patent No.: US 11,836,356 B2
(45) Date of Patent: Dec. 5, 2023

(54) SNAPSHOTS WITH SMART NETWORK INTERFACE CONTROLLER

(71) Applicant: Dell Products L.P., Round Rock, TX (US)

(72) Inventors: Zhang Flag, Shanghai (CN); Zheng Zhang, Shanghai (CN); Zhuo Zhang, Shanghai (CN); YungChin Fang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/576,477

(22) Filed: Jan. 14, 2022

(65) Prior Publication Data

US 2023/0229316 A1   Jul. 20, 2023

(51) Int. Cl.
*G06F 3/06* (2006.01)
*G06F 12/02* (2006.01)

(52) U.S. Cl.
CPC ............ *G06F 3/0619* (2013.01); *G06F 3/067* (2013.01); *G06F 3/0634* (2013.01); *G06F 3/0659* (2013.01); *G06F 3/0688* (2013.01); *G06F 12/0238* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 2008/0201536 A1* | 8/2008 | Hars | G06F 11/1469 711/154 |
| 2013/0339587 A1* | 12/2013 | Asnaashari | G06F 11/20 711/103 |
| 2017/0139615 A1* | 5/2017 | Olson | G06F 3/067 |
| 2019/0391884 A1* | 12/2019 | Gottapu | G06F 16/27 |
| 2021/0144517 A1* | 5/2021 | Guim Bernat | H04L 9/0637 |
| 2021/0232331 A1* | 7/2021 | Kannan | G06F 3/0631 |
| 2022/0001279 A1* | 1/2022 | Colenbrander | G06F 3/0685 |

* cited by examiner

*Primary Examiner* — Stephanie Wu
(74) *Attorney, Agent, or Firm* — Jackson Walker L.L.P.

(57) ABSTRACT

An information handling system may include at least one processor; a network interface; and a physical storage resource including a flash translation layer (FTL) operable to provide a mapping between logical storage addresses and physical storage addresses. The information handling system may be configured to: receive a request for a snapshot; for used portions of the physical storage resource, change a metadata identifier from a used status to a snapshot status; prevent deletion of those portions associated with the snapshot status; and transmit, via the network interface, information associated with the portions that are associated with the snapshot status.

15 Claims, 3 Drawing Sheets

SNAPSHOTS WITH SMART NETWORK INTERFACE CONTROLLER

TECHNICAL FIELD

The present disclosure relates in general to information handling systems, and more particularly to methods and systems for performing snapshots with a smart network interface controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs. For purposes of this disclosure, the terms "SmartNIC" and "DPU" may be used interchangeably.

Snapshots are a way of storing a record of the state of a storage resource of an information handling system (e.g., of a file system stored thereon) at a certain point in time. For purposes of this disclosure, the term "snapshot" may include a copy of all (or substantially all) files, a bit-level or byte-level copy, or any suitable data structure that is operable to store a record of the state of a storage resource at a certain point in time. In various embodiments, snapshots may be taken at the level of an entire storage resource (e.g., a hard drive, solid state drive, etc.), at the level of a partition, at the level of a namespace, etc.

Typically, creating a snapshot may use the processing resources of a host system. However, it can be challenging to take a snapshot when a system is running, particularly in the bare-metal context. Further, it can be challenging to take a snapshot when the host operating system has crashed.

Accordingly, embodiments of this disclosure provide improved techniques for taking snapshots by leveraging the resources of a SmartNIC.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with existing snapshot technology within an information handling system may be reduced or eliminated.

In accordance with embodiments of the present disclosure, an information handling system may include at least one processor; a network interface; and a physical storage resource including a flash translation layer (FTL) operable to provide a mapping between logical storage addresses and physical storage addresses. The information handling system may be configured to: receive a request for a snapshot; for used portions of the physical storage resource, change a metadata identifier from a used status to a snapshot status; prevent deletion of those portions associated with the snapshot status; and transmit, via the network interface, information associated with the portions that are associated with the snapshot status.

In accordance with these and other embodiments of the present disclosure, a method may include receiving a request for a snapshot at an information handling system that includes a physical storage resource including a flash translation layer (FTL) operable to provide a mapping between logical storage addresses and physical storage addresses; for used portions of the physical storage resource, changing a metadata identifier from a used status to a snapshot status; preventing deletion of those portions associated with the snapshot status; and transmitting, via a network interface of the information handling system, information associated with the portions that are associated with the snapshot status.

In accordance with these and other embodiments of the present disclosure, an article of manufacture may include a non-transitory, computer-readable medium having instructions thereon that are executable by at least one processor of an information handling system for: receiving a request for a snapshot at the information handling system, wherein the information handling system includes a physical storage resource including a flash translation layer (FTL) operable to provide a mapping between logical storage addresses and physical storage addresses; for used portions of the physical storage resource, changing a metadata identifier from a used status to a snapshot status; preventing deletion of those portions associated with the snapshot status; and transmitting, via a network interface of the information handling system, information associated with the portions that are associated with the snapshot status.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
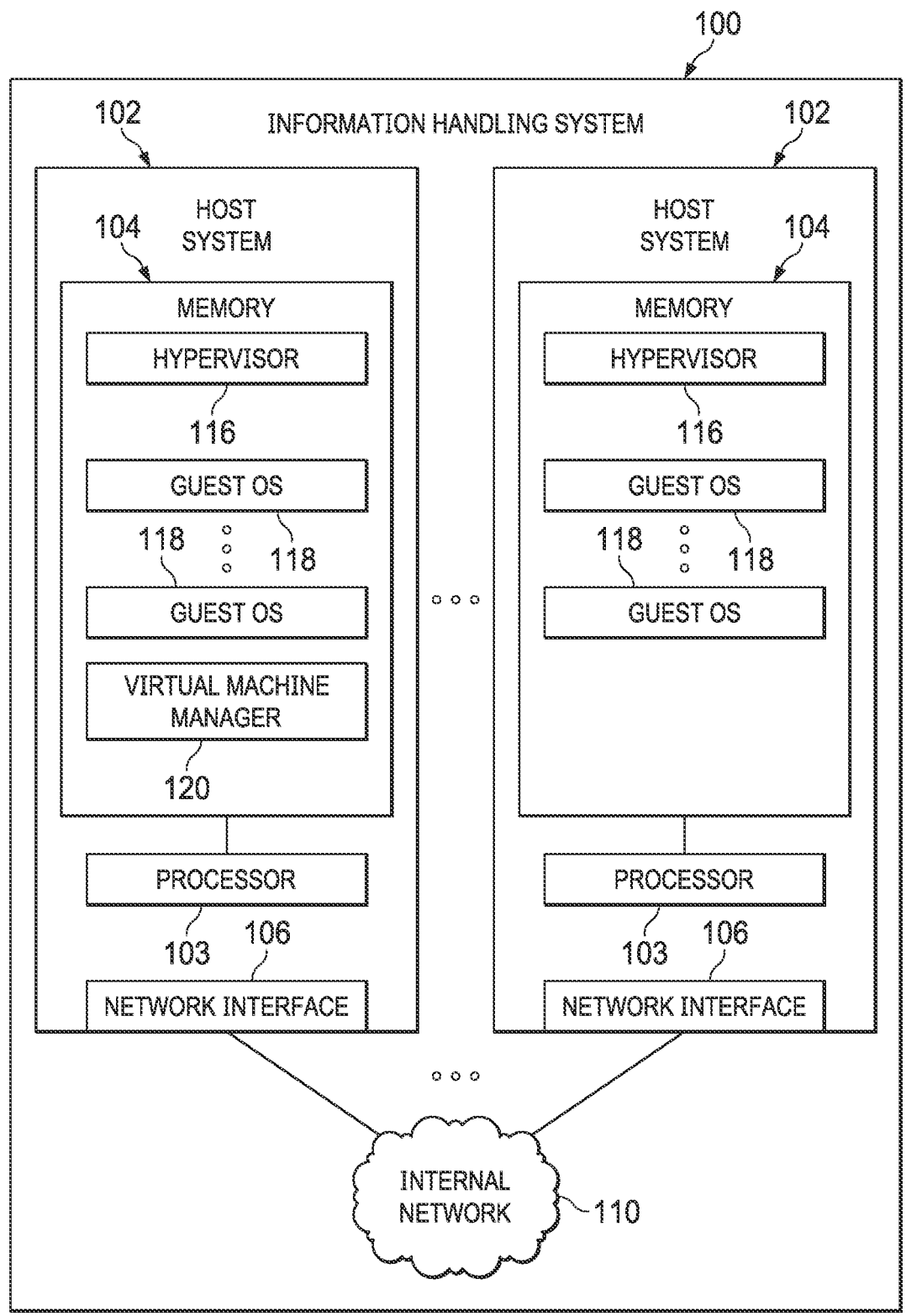
FIG. 1 illustrates a block diagram of selected components of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

Figure 2:
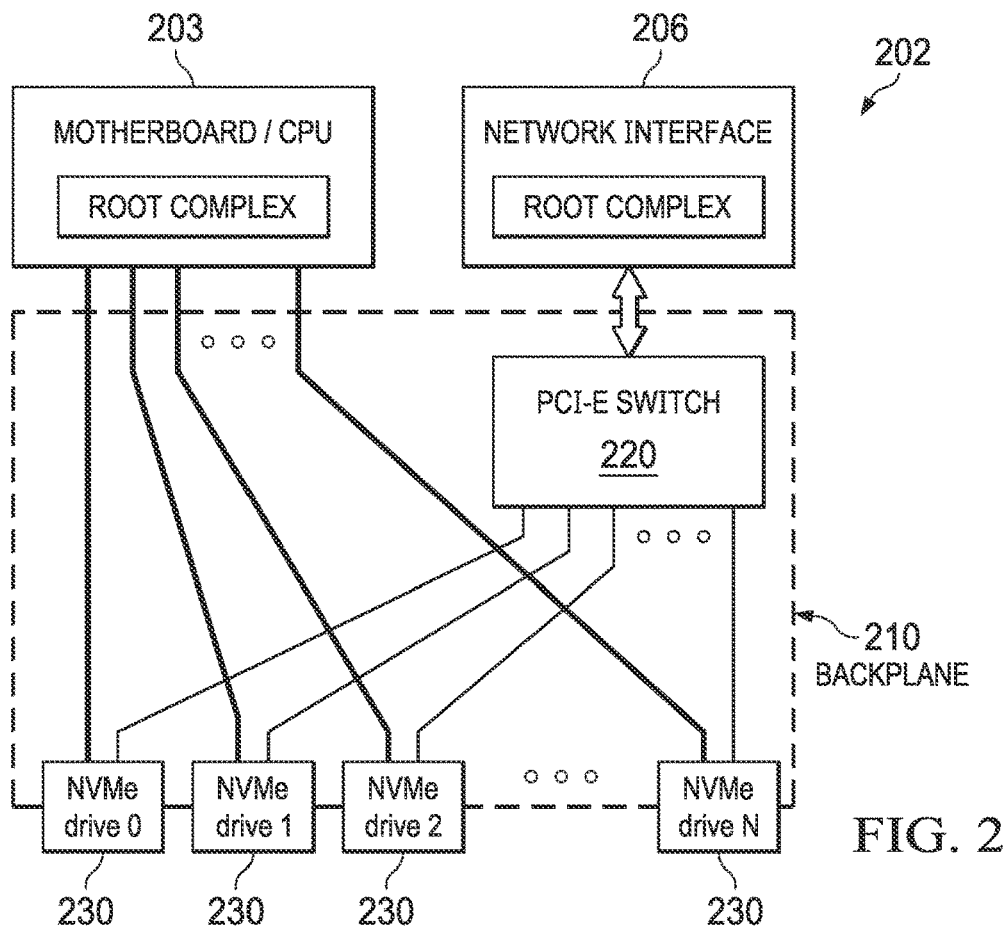
FIG. 2 illustrates a block diagram of selected components of an example information handling system, in accordance with embodiments of the present disclosure.

Turning now to FIG. 2, a block diagram of selected components of an information handling system 202 is shown, according to some embodiments. Information handling system 202 may include a backplane 210 which may be communicatively coupled to a motherboard and processor 203, which may include a PCIe root complex. For simplicity, motherboard and processor 203 may be referred to collectively herein simply as "processor 203" or as the "host system." Backplane 210 may also be communicatively coupled to a network interface 206 such as a SmartNIC. Network interface 206 may include various specialized elements such as processors, memory, etc. As shown, network interface 206 may also include another PCIe root complex. Information handling system 202 may also include various other components in some embodiments.

In some embodiments, backplane 210 may include slots that may be used to house one or more physical storage resources such as NVMe drives 230, also referred to herein as host storage resources. NVMe drives 230 may be dual-port drives, which may be coupled to and accessible via more than one PCIe root complex. As shown, NVMe drives 230 may be coupled to the root complex associated with processor 203, as well as the root complex associated with network interface 206. In some embodiments, a PCIe switch 220 may be coupled between such drives and one or both of the root complexes.

This disclosure provides the ability to capture a live snapshot for a file system regardless of whether or not a host OS associated with that file system is running. In one embodiment, this may be implemented via the flash translation layer (FTL) of NVMe drives 230, which is used to provide a mapping between physical drive addresses and logical page addresses. In other embodiments (e.g., non-solid-state storage resources), other data structures may be used alternatively or in addition. For example, any data structure (e.g., a table provided by a file system) that provides a mapping between physical drive addresses and logical identifiers such as addresses, file names, etc. may be used in some embodiments.

In some embodiments, for performance and longevity reasons, the FTL may assign the same logical address to new physical addresses in a copy-on-write fashion as data gets overwritten. For purposes of this disclosure, the term FTL refers generally to any hardware, software, and/or firmware that is configured to interface between logical addresses (e.g., as used by an OS) and physical storage elements of a storage resource.

Figure 3:
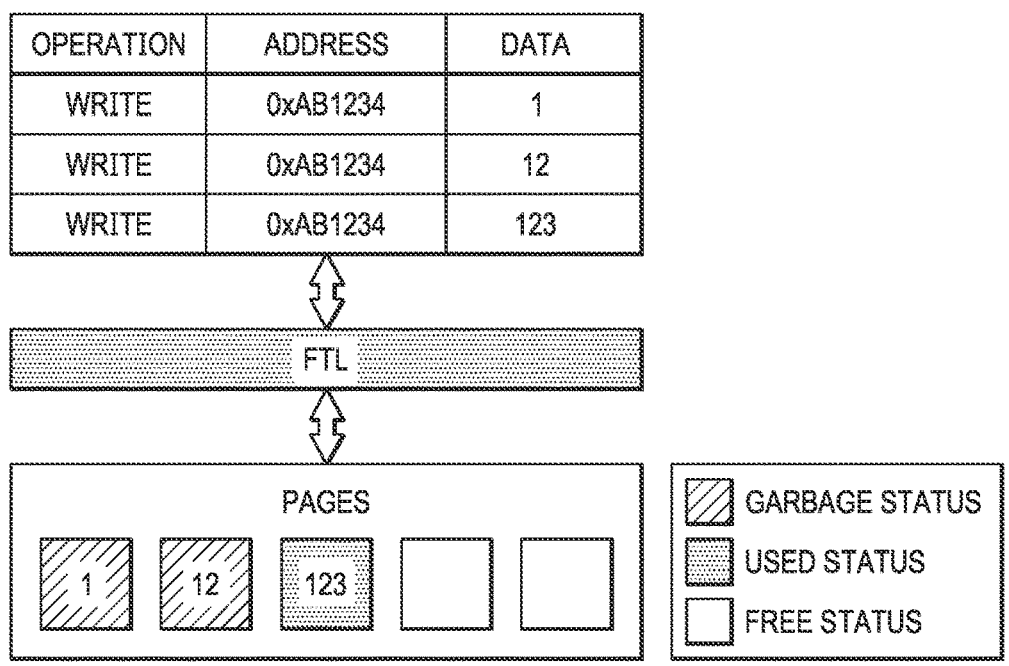
FIGS. 3-5 illustrate example data written to a storage resource, in accordance with embodiments of the present disclosure.

FIG. 3 illustrates one embodiment of the way that the FTL may operate during multiple successive writes to a particular logical address 0xAB1234. The OS or an application program first writes the data 1 to that address, then later writes the data 12 to that address, then later writes the data 123 to that address. Rather than repeatedly overwriting the same physical storage cells with new data, the FTL operates by marking the old physical addresses as garbage, which may be collected (e.g., cleared or reused) later. Then a new physical address can be allocated and associated with the logical address of the new data.

Accordingly, as shown, the old data values of 1 and 12 are still present in FIG. 3, but they are marked as garbage. The new value of 123 is marked as used and is associated with address 0xAB1234 by the FTL.

Embodiments of this disclosure may operate by adding snapshot functionality to the FTL (e.g., by making changes to the firmware of a storage resource). Accordingly, embodiments may operate at a sufficiently low level as to be usable on a system that is running or that has already experienced an OS crash.

Figure 4:
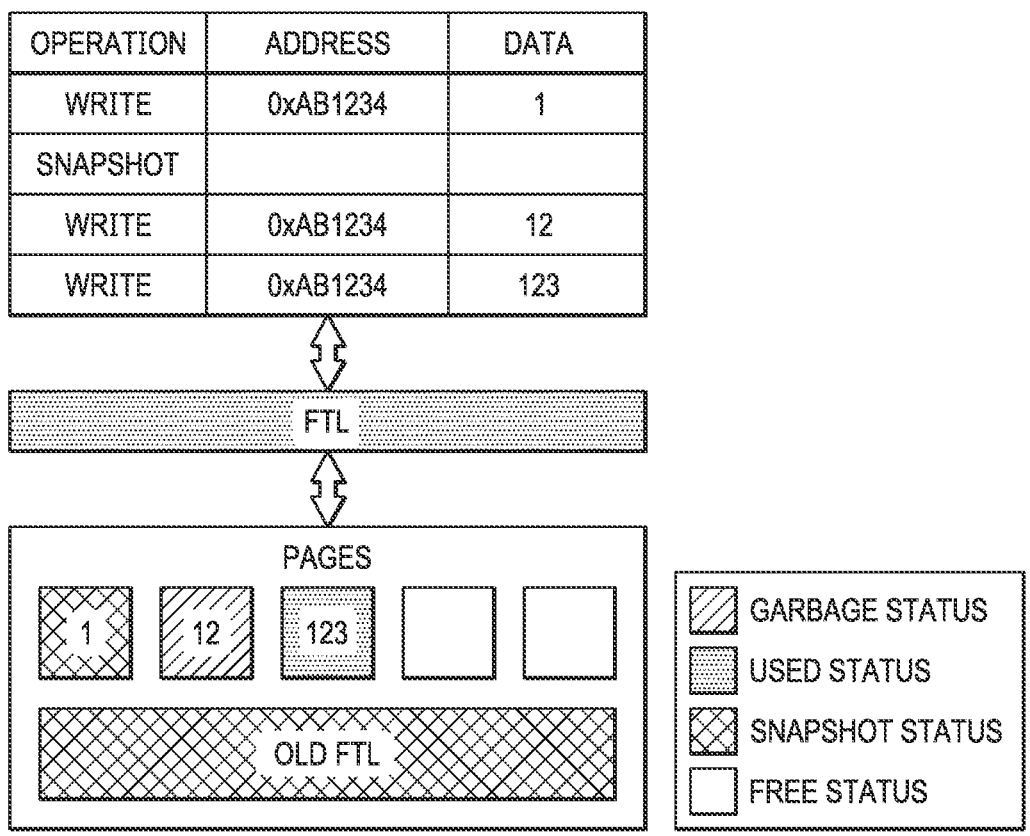

In particular, FIG. 4 illustrates an additional "snapshot" status identifier that may be used to mark physical addresses of a storage resource.

In FIG. 4, after the data value 1 is written to address 0xAB1234, a snapshot is requested. First, a flush command may be sent to the storage resource to save all cached data to persistent storage. Then a snapshot command may be sent to the storage resource, which causes the current FTL information to be saved (e.g., in internal storage space of the storage resource), shown as "old FTL" in FIG. 4. Further, all pages that are currently in use may be set to a snapshot status instead of a used status in the page metadata of the FTL.

After the snapshot information is stored in the FTL, subsequent garbage collection events will not erase pages that are marked as snapshot. Rather, those pages may be retained until a SmartNIC has had time to execute a background process of copying the old FTL and snapshot data to another location (e.g., an external storage resource, a network location, etc.).

If new data is written during the process of saving the snapshot, the FTL may assign new physical pages to receive the data as usual without interrupting the process. Once everything has been copied to the other location, in one embodiment the snapshot status may be removed from the affected pages (e.g., by returning them to used status if they have not been overwritten, or setting them to garbage status if they have).

If a roll back is needed (e.g., to return the state of the storage resource to its previous state at the time of the snapshot), this may also be accomplished in some embodiments. If rolling back onto the existing storage resource, then the pages marked as used may be marked as garbage, and the pages marked as snapshots may be marked as used. The old FTL data may then be restored.

Figure 5:
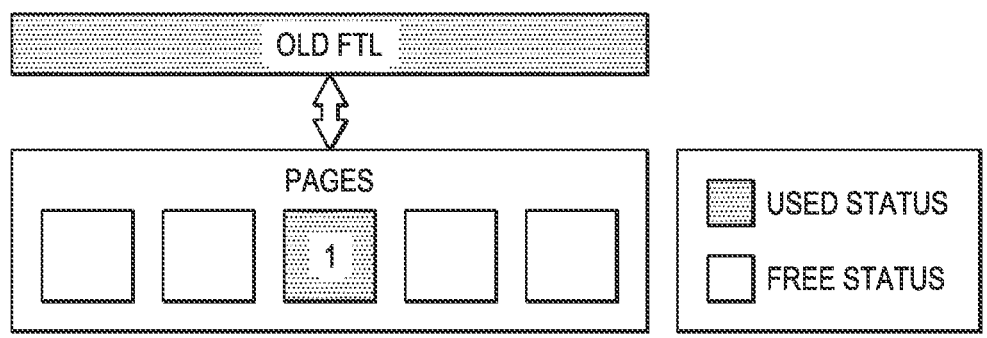

In another embodiment, the snapshot data may be rolled back onto a new storage resource (e.g., an identical model of NVMe drive). This may be accomplished by the SmartNIC copying the old FTL and snapshot pages to the new storage resource. The snapshot pages may be marked as used, rather than snapshot, on the new storage resource. The new storage resource should then have exactly the same data that was present on the old storage resource at the time of the snapshot, and the OS may boot from it accordingly. FIG. 5 illustrates the results of such a process on a new storage resource.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one host processor;
   a network interface; and
   a physical storage resource including a flash translation layer (FTL) operable to provide a mapping between logical storage addresses and physical storage addresses, wherein the physical storage resource is a dual-port Non-Volatile Memory Express (NVMe) drive and includes a firmware component configured to manage the FTL, wherein the physical storage resource is communicatively coupled to the at least one host processor via a first root complex, and wherein the physical storage resource is communicatively coupled to the network interface via a second, different root complex;
   wherein the firmware component of the physical storage resource is configured to:
   receive a request for a snapshot from the at least one host processor;
   for used portions of the physical storage resource, change a metadata identifier from a used status to a snapshot status;
   prevent deletion of those portions associated with the snapshot status; and
   transmit, via the network interface, information associated with the portions that are associated with the snapshot status.

2. The information handling system of claim 1, wherein the network interface is a SmartNIC.

3. The information handling system of claim 1, further configured to:
   in response to receiving a request for a rollback, reconstruct data of the physical storage resource as the data existed at a time of the request for the snapshot.

4. The information handling system of claim 3, wherein the data is reconstructed at the physical storage resource.

5. The information handling system of claim 3, wherein the data is reconstructed at a different physical storage resource.

6. A method comprising:
   receiving a request for a snapshot from a host processor at an information handling system that includes a physical storage resource including a flash translation layer (FTL) operable to provide a mapping between logical storage addresses and physical storage addresses, wherein the physical storage resource is a dual-port Non-Volatile Memory Express (NVMe) drive and includes a firmware component configured to manage the FTL, wherein the physical storage resource is communicatively coupled to the host processor via a first root complex, and wherein the physical storage resource is communicatively coupled to a network interface via a second, different root complex, and wherein the request is received at the firmware component;
   for used portions of the physical storage resource, the firmware component changing a metadata identifier from a used status to a snapshot status;
   the firmware component preventing deletion of those portions associated with the snapshot status; and
   the firmware component transmitting, via the network interface of the information handling system, information associated with the portions that are associated with the snapshot status.

7. The method of claim 6, wherein the network interface is a SmartNIC.

8. The method of claim 6, further comprising, in response to receiving a request for a rollback, reconstructing data of the physical storage resource as the data existed at a time of the request for the snapshot.

9. The method of claim 8, wherein the data is reconstructed at the physical storage resource.

10. The method of claim 8, wherein the data is reconstructed at a different physical storage resource.

11. An article of manufacture comprising a non-transitory, computer-readable medium having instructions thereon that are executable by at least one processor of an information handling system for:
   receiving a request for a snapshot at the information handling system, wherein the information handling system includes a physical storage resource including a flash translation layer (FTL) operable to provide a mapping between logical storage addresses and physical storage addresses, wherein the physical storage resource is a dual-port Non-Volatile Memory Express (NVMe) drive and includes a firmware component configured to manage the FTL, wherein the physical storage resource is communicatively coupled to the at least one processor via a first root complex, and wherein the physical storage resource is communicatively coupled to a network interface via a second, different root complex, and wherein the request is received at the firmware component;

for used portions of the physical storage resource, the firmware component changing a metadata identifier from a used status to a snapshot status;

the firmware component preventing deletion of those portions associated with the snapshot status; and the firmware component transmitting, via the network interface of the information handling system, information associated with the portions that are associated with the snapshot status.

12. The article of claim 11, wherein the network interface is a SmartNIC.

13. The article of claim 11, the instructions are further executable for, in response to receiving a request for a rollback, reconstructing data of the physical storage resource as the data existed at a time of the request for the snapshot.

14. The article of claim 13, wherein the data is reconstructed at the physical storage resource.

15. The article of claim 13, wherein the data is reconstructed at a different physical storage resource.

* * * * *